(No Model.)
J. L. CAUSEY.
SALT SPRINKLER FOR DOUGH CUTTING MACHINES.
No. 547,418. Patented Oct. 8, 1895.
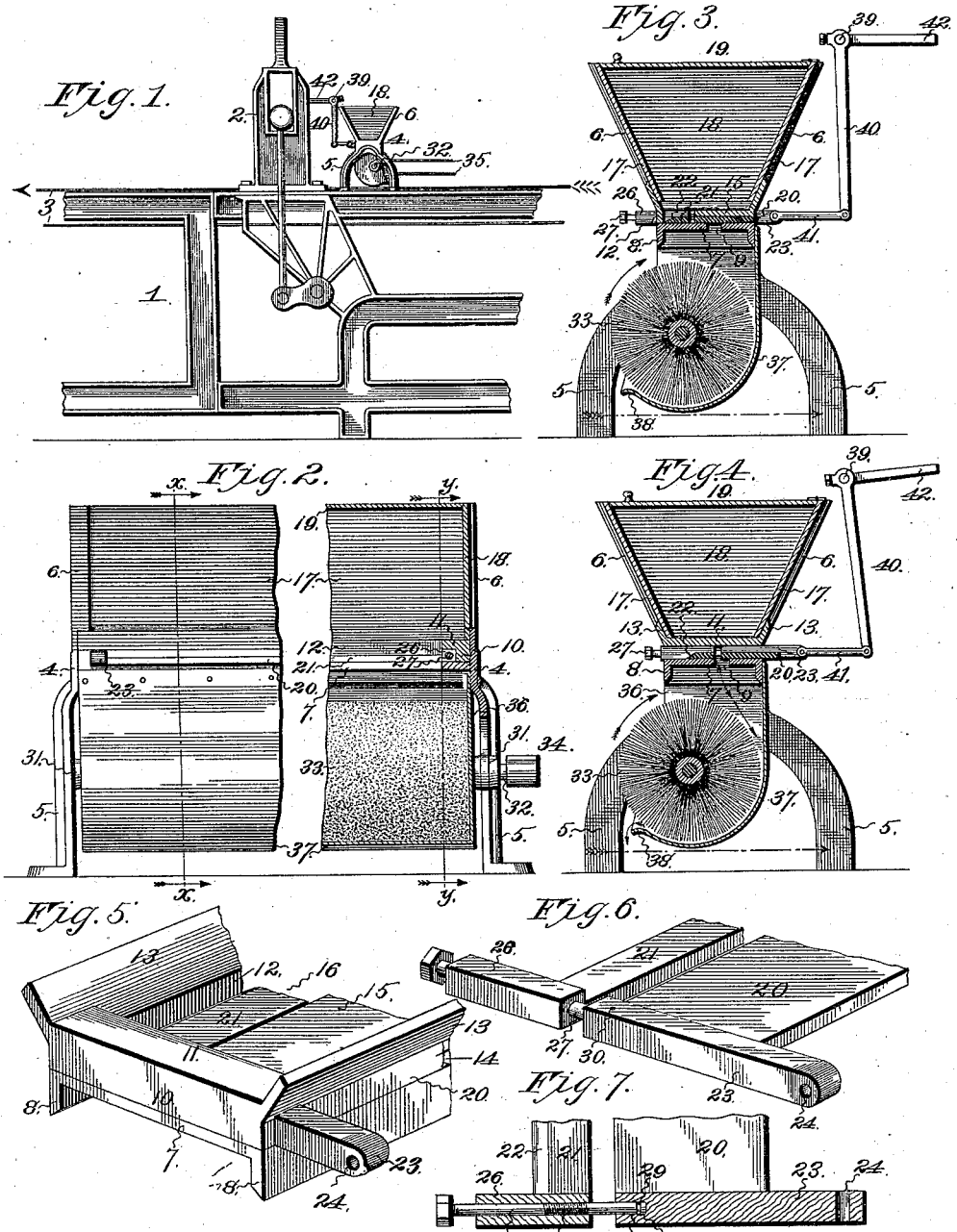
Witnesses:
Inventor: Joseph L. Causey,
By Hizson & Hizson
Attys.

UNITED STATES PATENT OFFICE.

JOSEPH L. CAUSEY, OF KANSAS CITY, MISSOURI.

SALT-SPRINKLER FOR DOUGH-CUTTING MACHINES.

SPECIFICATION forming part of Letters Patent No. 547,418, dated October 8, 1895.

Application filed January 24, 1895. Serial No. 535,990. (No model.)

*To all whom it may concern:*

Be it known that I, JOSEPH L. CAUSEY, of Kansas City, Jackson county, Missouri, have invented certain new and useful Improvements in Salt-Sprinklers for Dough-Cutting Machines, of which the following is a full, clear, and exact description, reference being had to the accompanying drawings, forming a part hereof.

My invention relates to dough-cutting-machine attachments, and more particularly to attachments for sprinkling salt upon the dough as it passes through the machine, and the object of the invention is to produce a device of this character which performs its function automatically, is positive and reliable in operation, and embodies in the highest degree simplicity, strength, durability, and inexpensiveness of construction.

With this object in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents in side elevation a portion of a dough-cutting machine provided with an attachment embodying my invention. Fig. 2 represents an enlarged view, partly in side elevation and partly in vertical longitudinal section, of said attachment. Fig. 3 represents a vertical transverse section of the same on the scale of Fig. 2 and on the line $x$ $x$ of the same and shows the valve as arranged to receive a charge of salt from the hopper. Fig. 4 is a vertical section on the same scale, taken on the line $y$ $y$ of Fig. 2, and shows the valve as arranged to discharge the salt. Fig. 5 represents a detail perspective view, on a still larger scale, of a portion of the attachment. Fig. 6 represents in perspective a portion of the valve, and Fig. 7 represents in plan view and section a portion of the valve and means whereby the same is adjusted so as to receive a greater or less charge of salt.

In the said drawings, 1 designates a dough-cutting machine of the usual or any preferred construction, which is provided with standards 2, (one only of which is shown,) between which reciprocates in a vertical plane the "dough-cutter," (not shown,) and between which the endless apron 3 travels longitudinally for conveying the dough through the machine and also for accomplishing other objects not necessary to mention herein, as it forms no part of the invention. Mounted upon said machine and above the upper portion of the said endless apron is an improved salt-sprinkler, which I will now proceed to describe.

4 4 designate standards which are arranged at opposite sides of the apron, each consisting of a central portion from which the legs 5 diverge downwardly and are bolted or otherwise suitably secured to the said framework 1, and the arms 6 diverge upwardly. The body portions of said standards are connected by a horizontal base-plate 7, which is provided at opposite sides with the depending flanges 8, and to one side of its center with the longitudinal slot 9. The end portions of a casting, in contour corresponding to the said plate 7, consist of depending flanges 10, which rest upon the plate 7 at opposite ends, and the horizontal flanges 11, which project inwardly from the upper ends of said flanges 10. At one side of the attachment the longitudinal flange 12 connects the corresponding ends of the said end portions and rests also upon the plate 7, and extending upward and outward from said flange 12, and also from and connecting the said end portions, is the flange 13. A similar flange 13 connects and extends upward and outward from the opposite ends of the said end portions and diverges at an equal angle with the said first-mentioned flange 13. Therefore it will be apparent that a space 14 intervenes between the upper side of the plate 7 and the lower or opposing side of the horizontal flange or partition 15, which projects inwardly from the lower end or margin of the last-mentioned flange 13 more than half-way across the space between said flange and the flange 12, or a sufficient distance to entirely overlap the slot 9 of the said plate 7, and also to form a space 16 between the inner margin of the said partition and the said flange 12. Connecting the parallel arms 6 of said standards 4, and extending from the flange 11 to the upper ends of said arms 6, are the sides 17, which in conjunction with the ends 18 also connecting said arms 6 and said sides, form a hopper, which is closed at its upper side by a lid 19, which is hinged, as shown, or secured in any other suitable or preferred manner. The valve of this attachment comprises two plates or sections 20 and 21, respectively, the plate 20 preferably equaling in width the flange or partition 15, and the plate or section 21 being considerably narrower than the space 16 and formed with a beveled surface 22, which extends downwardly and outwardly at its outer margin so as to constitute practically a wedge, the object of which will be hereinafter explained. The plate or section 20 of the valve fits snugly within the space 14 and normally closes the slot 9, as shown in Fig. 3, and said plate or section is provided at its opposite ends with the ribs 23, which engage the grooves formed by the end portions hereinbefore described, said ribs bearing against the vertical flanges 10, so as to prevent any movement longitudinally of the attachment and against the under side of the flanges 11, so as to prevent any upward movement of said plate or section and at the same time relieve the same of frictional contact with the bottom of the partition 15 when in operation. The said ribs 23 project rearwardly beyond the side of the hopper, as at 24, and are provided in their opposite ends with the longitudinal cylindrical cavities 25. The plate or section 21 is also provided at its opposite ends with ribs 26, which extend in longitudinal alignment with the ribs 23 and also occupy the grooves formed by the said flanges 10 and 11. Said ribs also project beyond the opposite side of the hopper, and are provided with a longitudinal bore which is screw-threaded for a short distance, and extending through the same are bolts 27, which are provided with heads at their outer ends and with threads 28, which engage the threaded portion of the bore of said ribs. The inner ends of said bolts engage the cylindrical cavities 25 and are provided with annular grooves 29, and extending through the said ribs 23, and engaging said grooves 29 in such manner as to permit of the rotation of said bolts and at the same time prevent the withdrawal of the same from the cavities 25, are the pins 30. By this construction it will be apparent that the operation of the bolts 27 in one direction will cause the section 21 of the valve to approach the section 20 and therefore diminish the distance between them, and that the rotation of said bolts in the opposite direction will cause said section to recede or move away from the section 20, so as to increase or widen the space between them. By this operation the quantity of salt discharged from the hopper may be varied at will. Projecting inwardly from each standard is a lug 31, and journaled near its opposite ends in said lugs is the shaft 32, which is arranged preferably in advance of the vertical plane of the slot 9, and mounted upon said shaft is a rotary brush 33 of the construction shown or of any other suitable or preferred construction. Mounted upon one end of said shaft is a pulley 34, which is connected preferably by a belt 35 to and receives motion from a second brush. This brush, as it forms no part of my invention, is not illustrated in the accompanying drawings. The brush 33 is partly surrounded by a casing carried by and forming a part of the attachment, said casing consisting of the end portions 36 and the longitudinal portion 37, which connects said end portions and is segmental in cross-section, extending concentrically around the axis of said brush and adjacent to its periphery for a suitable distance and terminating in the curved lip 38, which flares from the periphery of said brush so as to permit the salt to be easily discharged, as will be presently explained.

Extending transversely of the machine, and parallel with the attachment, is the shaft 39, which may be supported in bearings carried by the attachment or bearings carried by the dough-cutting machine, and depending from each end of said shaft, and rigidly secured upon the same by set-screws, as shown, or in any other suitable manner, are the crank-arms 40, which are pivotally connected at their lower ends to the contiguous ends of the ribs 23 of the section 20 of the valve by the link-rods 41. A crank-arm 42 projects also from the shaft 39 into the path of the reciprocating dough-cutter, (not shown,) which therefore upon its downward stroke forces the valve to the position shown in Fig. 3, and upon its up-stroke forces the valve to the position shown in Fig. 4, by contact with the free end of the arm 42, as will be understood.

When the hopper is supplied with salt and the valve is in the position shown in Fig. 3, it is apparent that the space between the sections 20 and 21 of the valve and between the ribs thereof is completely filled with salt, which gravitates therein through the space 16, communicating directly with the interior of the hopper, the bottom proper of which is formed by the partition 15. Now as the reciprocating dough-cutter rises it contacts with the arm 42 and moves the valve to the position shown in Fig. 4, and therefore permits the salt occupying the space between the sections of said valve to descend through the slot 9 in the direction of the arrows, Fig. 4, and upon the swiftly-rotating brush 33, which conveys it through the casing 37 and discharges it in the direction also indicated by the arrow, same figure, upon the dough traveling in the direction indicated by the dotted arrow, same figure. As the cutter descends it moves the valve back to its original position, as shown in Fig. 3, where it receives a fresh charge of salt. The function of the beveled surfaces 22 will now be understood, as it is obvious that when the valve moves to the position shown in Fig. 4 the salt drops down upon the base-plate 7, and it would be impossible to dislodge it if the section were not beveled to form practically a wedge at its outer margin, which, engaging the salt, lifts the same out of its path and thereby prevents it becoming wedged and packed between the flange 12 and the contiguous margin or edge of said section 21. Should the salt become wedged or packed, as described, it is obvious that the attachment in some part, or the reciprocating dough-cutter, would be broken or otherwise injured. The attachment above described, of course, will sprinkle sugar, flour, &c., as well as salt.

From the above description it will be apparent that I have produced a salt-sprinkling attachment for dough-cutting machines which is positive and reliable in operation and is simple, strong, durable, and inexpensive of construction.

Having thus described my invention, what I claim as new, and desire to secure by Letters Patent, is—

1. A salt-sprinkler for dough-cutting machines, comprising a hopper, a slotted base-plate, a valve interposed between the hopper and said slotted base-plate, consisting of a pair of plates or sections, and means to operate the same so as to cover and uncover alternately the slot of said base-plate, substantially as set forth.

2. A salt-sprinkler for dough-cutting machines, comprising a hopper, a slotted base-plate, a partition arranged above and overlapping the slot of the said base-plate, a valve interposed between said base-plate and said partition and communicating with said hopper, and means to operate the same, substantially as set forth.

3. A salt-sprinkler for dough-cutting machines, comprising a hopper, a slotted base-plate, a valve interposed between said hopper and said slotted base-plate, consisting of a pair of plates or sections, means to adjust said plates or sections toward or from each other, and means to operate said valve so as to cover or uncover the slot of said base-plate, substantially as set forth.

4. A salt-sprinkler for dough-cutting machines, comprising a hopper, a slotted base-plate, a valve interposed between said slotted base-plate and said hopper, consisting of a pair of plates or sections, provided with aligned ribs at their opposite ends, a partition or plate above said valve, and transversely extending flanges snugly embracing the ribs of the said valve, substantially as set forth.

5. A salt-sprinkler for dough-cutting machines, comprising a hopper, a slotted base-plate, and a valve interposed between said hopper and said slotted base-plate, consisting of two sections arranged a suitable distance apart, and one of them provided at its outer margin with a beveled surface, substantially as set forth.

6. In a salt-sprinkler for dough-cutting machines, a valve comprising a pair of plates or sections, bolts engaging internal threads in one of said sections and projecting loosely into the other of said sections, and provided with a head at one end and with an annular groove in the end which projects loosely into one of said sections, and a pin carried by said section and engaging said groove, substantially as and for the purpose set forth.

7. A salt-sprinkler for dough-cutting machines, comprising end-standards, a hopper carried thereby, a slotted base-plate below the hopper, a partition above said slotted base-plate, a valve interposed between said base-plate and said partition, a shaft, crank-arms depending therefrom and pivotally linked to said valve, and another crank-arm projecting from said shaft and adapted to be operated by the vertical reciprocation of the cutter of the dough-cutting machine, substantially as and for the purpose set forth.

In testimony whereof I affix my signature in the presence of two witnesses.

JOSEPH L. CAUSEY.

Witnesses:
HENRY ALTHAVER,
M. R. REMLEY.